(12) United States Patent
Dodge

(10) Patent No.: US 10,654,543 B2
(45) Date of Patent: May 19, 2020

(54) ROPE CLASP

(71) Applicant: Benjamin Dodge, Circle Pines, MN (US)

(72) Inventor: Benjamin Dodge, Circle Pines, MN (US)

(*) Notice: Subject to any disclaimer, the term of this patent is extended or adjusted under 35 U.S.C. 154(b) by 52 days.

(21) Appl. No.: 15/585,275

(22) Filed: May 3, 2017

(65) Prior Publication Data

US 2017/0297656 A1    Oct. 19, 2017

Related U.S. Application Data

(63) Continuation of application No. 14/719,611, filed on May 22, 2015, now Pat. No. 9,643,686, which is a continuation of application No. 13/733,566, filed on Jan. 3, 2013, now Pat. No. 9,038,247.

(51) Int. Cl.
| | |
|---|---|
| *B63B 21/08* | (2006.01) |
| *B63B 21/20* | (2006.01) |
| *F16B 2/10* | (2006.01) |
| *F16G 11/10* | (2006.01) |

(52) U.S. Cl.
CPC ............ *B63B 21/08* (2013.01); *B63B 21/20* (2013.01); *F16B 2/10* (2013.01); *F16G 11/101* (2013.01); *B63B 2021/203* (2013.01); *Y10T 24/3936* (2015.01); *Y10T 24/3956* (2015.01); *Y10T 24/3991* (2015.01)

(58) Field of Classification Search
CPC ............ Y10T 24/3936; Y10T 24/3938; Y10T 24/394; Y10T 24/3942; Y10T 24/3944; Y10T 24/3949; Y10T 24/3951; Y10T 24/3953; Y10T 24/3956; Y10T 24/3991; B63B 21/08; B63B 21/20; B63B 2021/203; F16B 2/10; F16G 11/101
See application file for complete search history.

(56) References Cited

U.S. PATENT DOCUMENTS

| | | |
|---|---|---|
| 408,586 A | 8/1889 | Coleman |
| 2,485,445 A | 10/1949 | Hoffman |
| 3,146,614 A | 9/1964 | Von Frantzius |
| 3,323,324 A | 6/1967 | Bohlinger et al. |
| 3,963,855 A | 6/1976 | Hawkins et al. |
| 4,414,712 A | 11/1983 | Beggins |
| 4,427,253 A | 1/1984 | Smith et al. |

(Continued)

OTHER PUBLICATIONS

U.S. Appl. No. 13/733,566, filed Jan. 3, 2013, Inventor(s): Dodge.

(Continued)

*Primary Examiner* — Robert Sandy
(74) *Attorney, Agent, or Firm* — Patterson Thuente Pedersen, P.A.

(57) ABSTRACT

A rope clasp device for securing a rope eliminates the need for a knot in a rope by selectively clasping and encasing at least one portion of a rope in a toothed clamp. The rope clasp device comprises a base, at least one, but generally two swinging doors, and a lock. The swinging doors are pivotably coupled to the base in order to be moved between an open position and a closed position. In the closed position, a pair of channels for passage of a rope is defined between the base and the doors. The channels are defined by a plurality of clasping teeth to retain the rope therein.

5 Claims, 13 Drawing Sheets

(56) References Cited

U.S. PATENT DOCUMENTS

| | | |
|---|---|---|
| 4,455,717 A | 6/1984 | Gray |
| 4,840,333 A | 6/1989 | Nakayama |
| 4,847,956 A | 7/1989 | Levine |
| 4,942,644 A | 7/1990 | Rowley |
| 4,993,123 A | 2/1991 | Siwek |
| 5,118,139 A * | 6/1992 | Lott ..................... F16L 55/175 138/99 |
| 5,245,729 A | 9/1993 | Greff |
| 5,245,730 A | 9/1993 | Martin |
| 5,577,299 A | 11/1996 | Thompson et al. |
| 5,660,133 A | 8/1997 | Munich |
| 5,669,590 A | 9/1997 | Przewodek |
| 5,715,578 A | 2/1998 | Knudson |
| 6,269,993 B1 | 8/2001 | Ebejer et al. |
| 7,172,162 B2 | 2/2007 | Mizukoshi et al. |
| 7,181,807 B2 | 2/2007 | Oatway |
| 7,225,507 B2 | 6/2007 | Anderson et al. |
| 7,996,962 B2 | 8/2011 | Peterson |
| 8,088,053 B2 | 1/2012 | Whyatt |
| 8,113,481 B1 | 2/2012 | Krysak |
| 2005/0095062 A1 | 5/2005 | Iverson |
| 2008/0099226 A1 | 5/2008 | Goch |
| 2008/0283688 A1 | 11/2008 | Kaneko et al. |
| 2009/0229085 A1 | 9/2009 | Franklin et al. |

OTHER PUBLICATIONS

U.S. Appl. No. 14/719,611, filed May 22, 2015, Inventor(s): Dodge.

* cited by examiner

ROPE CLASP

RELATED APPLICATION

This application is a continuation of U.S. patent application Ser. No. 14/719,611 filed May 22, 2015, now U.S. Pat. No. 9,643,686 issued May 9, 2017, which in turn is a continuation of U.S. patent application Ser. No. 13/733,566 filed Jan. 3, 2013, now U.S. Pat. No. 9,038,247 issued May 26, 2015.

FIELD OF THE INVENTION

The present invention relates to securing and clasping ropes, and more particularly to a rope clap for releasably securing a rope.

BACKGROUND OF THE INVENTION

The ability to secure one item to another has been a valuable and important skill throughout history. Tying a knot with a rope can be useful in hundreds of activities ranging from docking a boat to climbing a mountain to pitching a tent.

While tying your own conventional knots can be utilized, this skill requires time and lots of practice to manage. Often times, the knot will only last for a certain period of time before enough wear and tear requires a new knot to be tied. Further, tying a knot requires the person tying the knot to know which type of knot should be used at the particular instance. The wrong type of knot could come untied very quickly, which could be very undesirable depending on the circumstances.

In most applications, ropes are tied to anchor points. By tying the rope to the anchor point, the ropes can loosen depending on several conditions including the length the rope was tied to the anchor point and the weather.

Another potential disadvantage when using conventional knots is that it is very easy to get a knot so tight that it cannot be physically untied with one's hands. Even if the knot eventually is untied with one's hands, the person who untied the rope usually has rope burns and marks on his hands due to the strenuous amount of work needed. In the circumstances where one's hands are insufficient for untying the knot, a knife, scissor, or other cutting means is needed to cut out the knot of the rope. As a result, the length of the rope will be shortened; thus, the user of the rope will likely have to continually buy additional ropes with time.

Over time, there have been several attempts to create rope clamps or clasps to help correct for these problems. However, there remains a need for a rope clasp that eliminates the potential for ropes to loosen and allows for a fast and easy securing of a rope.

SUMMARY OF THE INVENTION

A rope clasp device for securing a rope eliminates the need for a knot in a rope by selectively clasping and encasing at least one portion of a rope in a toothed clamp. The rope clasp device comprises a base, at least one, but generally two swinging doors, and a lock. The swinging doors are pivotably coupled to the base in order to be moved between an open position and a closed position. In the closed position, a pair of channels for passage of a rope is defined between the base and the doors. The channels are defined by a plurality of clasping teeth to retain the rope therein. There can be a slight gap between the screw used to mount the channels containing the teeth to the base and the swing doors to provide for compression of the rope. As the rope pulls tight into the teeth, the gap allows the channels to come closer together to create compression on the rope as an additional securing feature.

The swinging doors can be pivotably coupled to the base by a plurality of hinges each containing a hinge pin, wherein the hinge pins are positioned substantially parallel to the channels so that the swinging doors each pivot parallel to the channels. Furthermore, the hinges can be positioned on the outer edge of the base so that swinging doors oppose each other and open away from the center of the base.

The base and swinging doors can be defined by apertures capable of receiving separately molded interchangeable tooth channels having a plurality of clasping teeth. The interchangeable tooth channels can be coupled to the rope clasp device by screws or adhesive. In one embodiment the plurality of clasping teeth can be oriented in the same direction and the screw coupling the interchangeable tooth channel to the aperture can permit limited movement of the interchangeable tooth channel relative to the aperture. The plurality of clasping teeth can be constructed of metal and embedded within a plastic interchangeable tooth channel.

The swing doors can be selectively locked in place with a winged push lock. The winged push lock can have a cylindrical post fixedly coupled to the base and a winged head pivotably coupled to the post. The winged head can have an internal aperture capable of receiving the cylindrical post. The winged head's freedom to move relative to the post is defined by a groove within the internal aperture through which a pin fixedly coupled to the post travels. The winged push lock is further defined by generally two wings capable of selectively contacting the swinging doors to hold the swinging doors in a fixed position, thereby securing a loop in a rope in the clasp in lieu of a knot.

In an alternate embodiment the rope clasp device has a latch assembly in place of the winged push lock. The latch assembly consists of a hook and post. The hook is pivotably coupled to one swinging door and the post is fixedly coupled to the other swinging door, such that the hook can be selectively coupled to the post to hold the swinging doors in a fixed position, thereby securing a loop in a rope in lieu of a knot. The swinging doors can be spring biased.

The rope clasp device can be made by molding a base out of plastic, molding a plurality of swinging doors out of plastic, molding a plurality of interchangeable tooth channels out of plastic, affixing metal teeth within the interchangeable tooth channels, affixing the plurality of interchangeable tooth channels to apertures defined within the base and plurality of swinging doors, and affixing a winged push lock to the base. An alternative embodiment of the rope clasp device can be made by affixing a hook and post to at least two swinging doors in place of the winged push lock.

The above summary of the invention is not intended to describe each illustrated embodiment or every implementation of the present invention. The figures and the detailed description that follow more particularly exemplify these embodiments.

Figure 1:
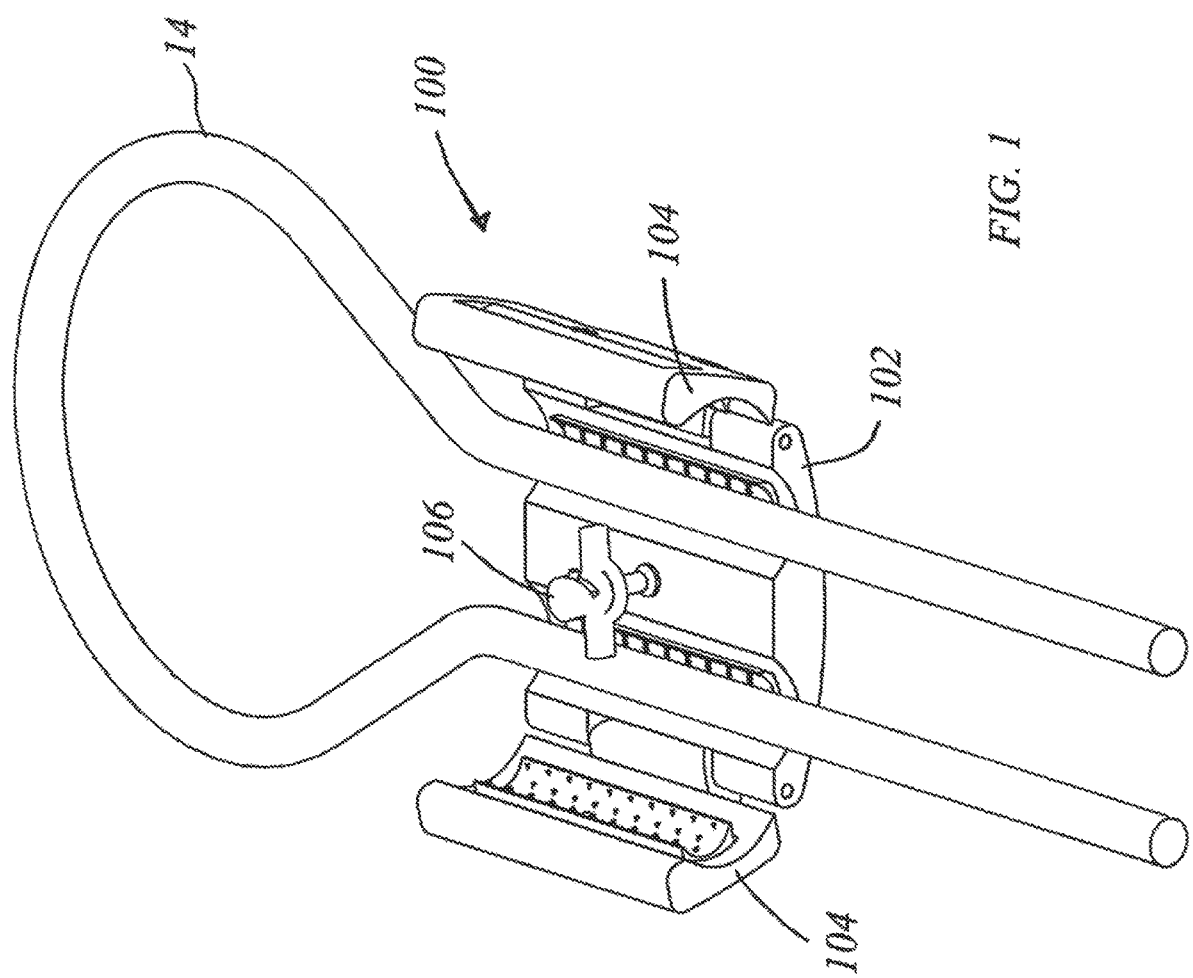
FIG. 1 depicts a perspective view of a rope clasp device with a rope in the open position in accordance with an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

FIGS. 1-4 depict an embodiment of a rope clasp according to the present invention. Rope clasp system 100 includes base 102, swinging doors 104, winged push lock 106, teeth channel insert insert 112, and teeth channel insert insert 113. In one embodiment, teeth channel insert insert 112 and teeth channel insert insert 113 are molded solid, and clasping teeth 114 are separately drilled into teeth channel insert insert 112 and clasping teeth 115 are separately drilled into teeth channel insert insert 113. The teeth channel insert insert 112 and teeth channel insert insert 113 are set in place with recessed screws so they may be replaced or changed to adjust for different rope sizes. The clasping teeth 114 and clasping teeth 115 encase a rope placed within the rope clasp system 100 and allow for the expansion and lock of the rope to prevent the rope from sliding through the clasp 100.

Figure 2:
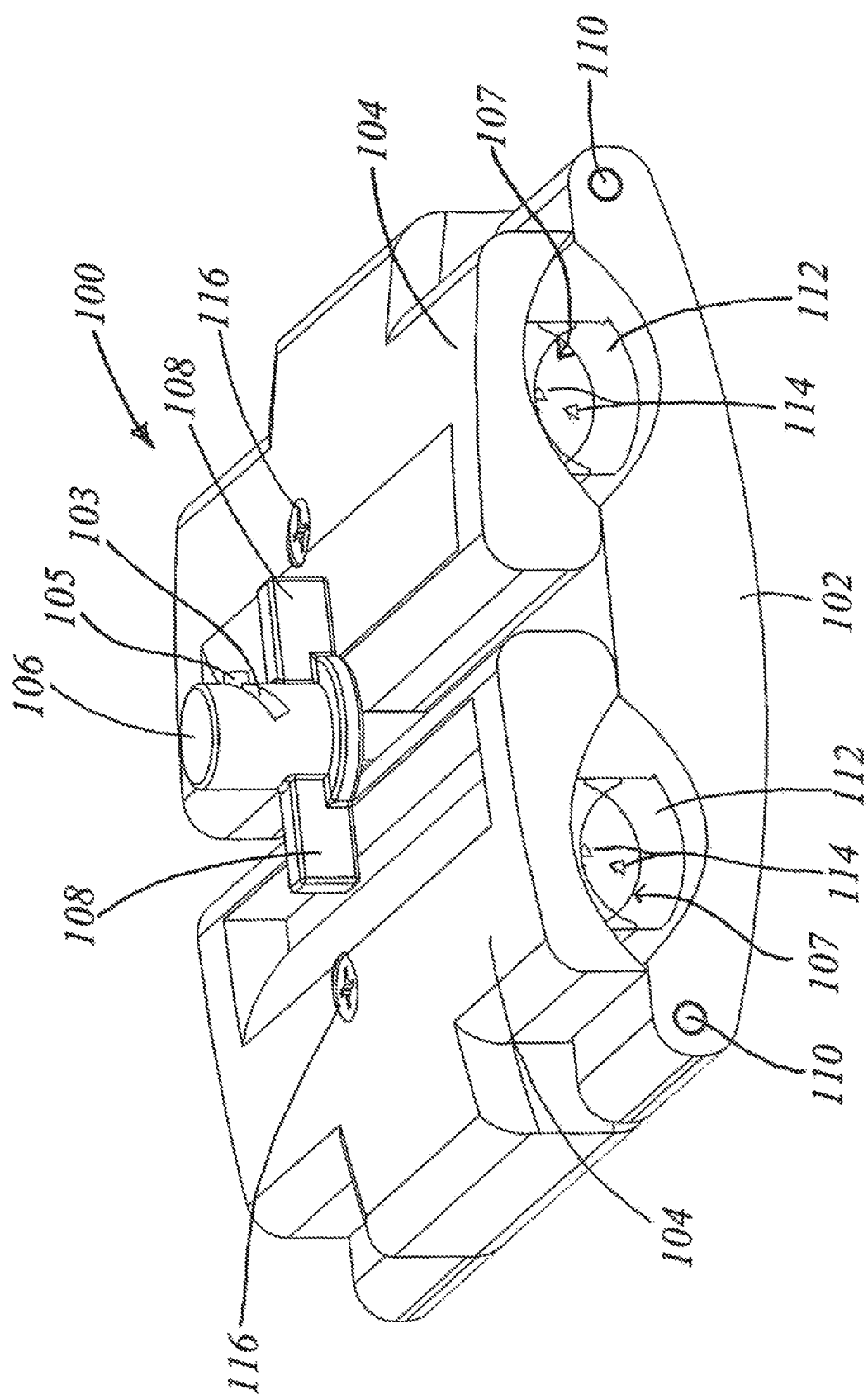
FIG. 2 depicts a perspective view of a rope clasp device without a rope in the closed position in accordance with an embodiment of the present invention.

Teeth channel insert insert 112 can be recessed into base 102, and teeth channel insert insert 113 can be recessed into swinging doors 104. The teeth channel insert insert 112 and teeth channel insert insert 113 are recessed into the swinging doors 104 and base 102 so that the teeth channel insert insert 112 and teeth channel insert insert 113 do not slip out of the rope clasp system 100 when tension is applied on a rope engaged with the rope clasp system 100. FIG. 2 shows how teeth channel insert insert 113 can be attached to swinging doors 104 by means of recess screws 116. While not depicted, teeth channel insert insert 113 may attach to swinging doors 104 by other attachment mechanisms such as, for example, adhesives or hook and loop fasteners, so long as they are attached in a way so that they do not slip out when tension is applied to a rope engaged with the rope clasp system 100. Hinge pins 110 attach swinging doors 104 that are hinged to base 102 so that the swinging doors 104 can rotate at an angle away from the base 102 thereby allowing a rope to be placed or removed from teeth channel insert insert 112 and teeth channel insert 113.

Figure 3:
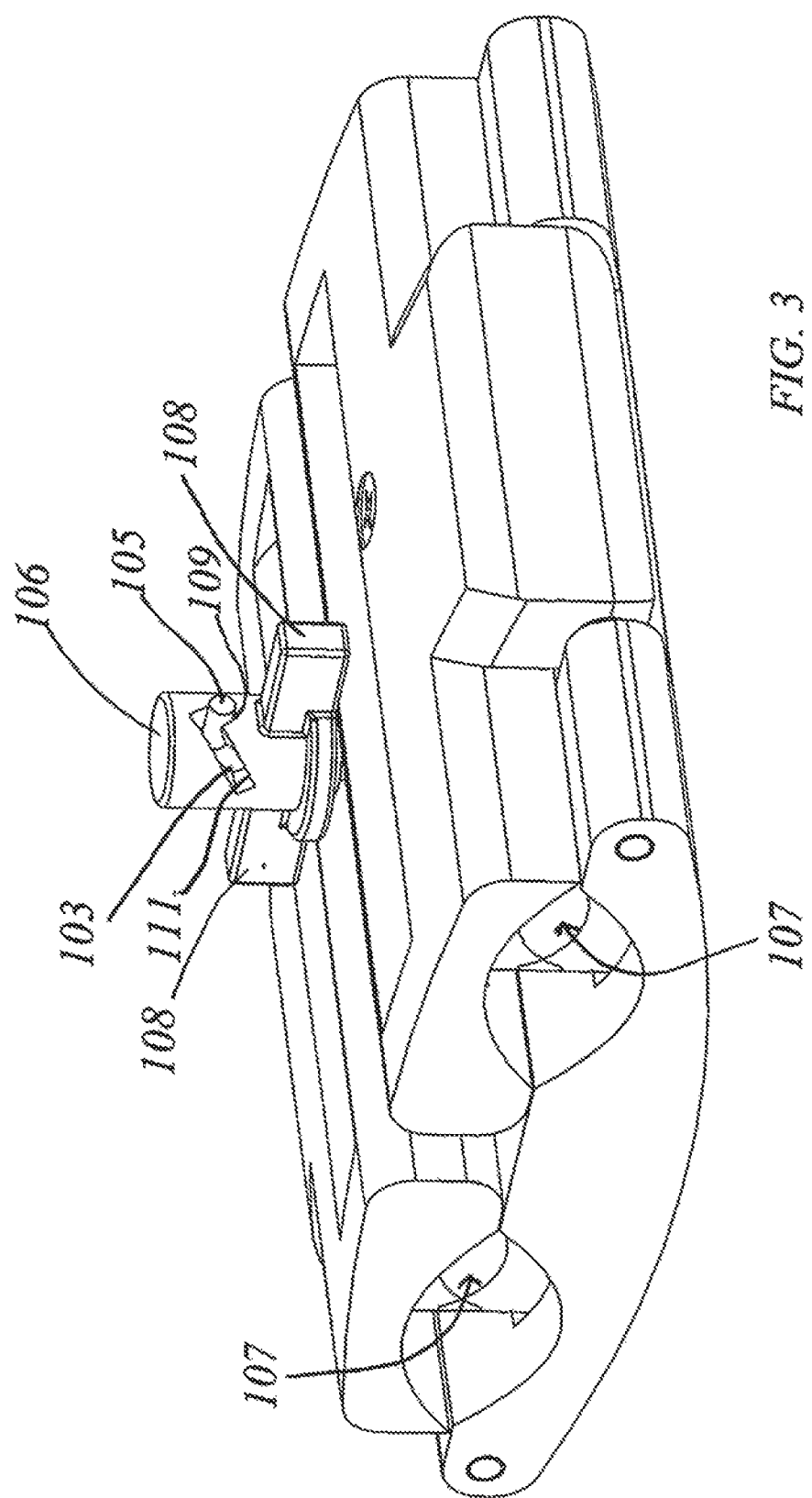
FIG. 3 depicts a perspective view of a rope clasp device in accordance with an embodiment of the present invention.
Figure 4:
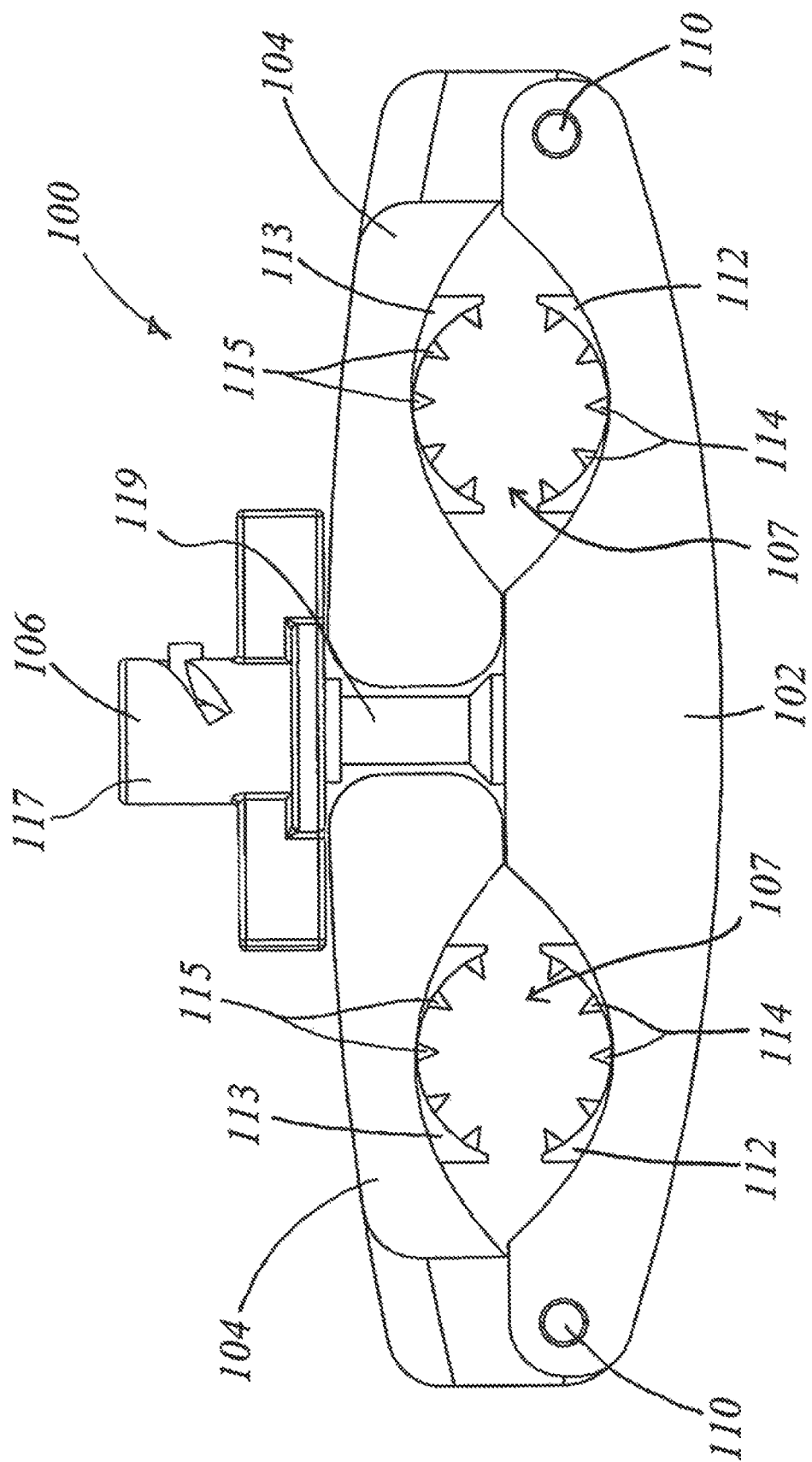
FIG. 4 depicts side elevation view of a rope clasp device in accordance with an embodiment of the present invention.

FIGS. 2 and 3 show the rope clasp system 100 in a closed, locked position according to the present invention. The rope clasp system 100 can be closed and locked using a center spring loaded push pin like the winged push lock 106. Winged push lock 106 can include a head 117 and a post 119 that can run through base 102, where it is secured at an outer surface of base. To place the rope clasp system 100 in a closed position, swinging doors 104 are pivoted towards base 102 to confrontingly align the doors with the base. This forms channels 107 through which rope 14 can extend. Winged push lock 106 can be pushed down and head 117 turned relative to post 119 such that winged push lock pin 105 falls into a depression 109 in aperture 103 as shown in FIG. 3 thereby positioning wings 108 of winged push lock 106 over a portion of each of the swinging doors 104, so that the swinging doors 104 cannot swing away from base 102. To open one or both swinging doors 104 from base 102, a user must push down and turn winged pushed lock 106 in the opposite direction so that winged push lock pin 105 slides out of the depression in aperture 103 and back into its resting position, thereby allowing swinging doors 104 to swing freely. By performing this action, there will no longer be a downward exerting force on swinging doors 104. Thus, swinging doors 104 can then swing up and into an open position, thereby releasing the rope from clasping teeth 114 and clasping teeth 115. Although described with respect to a pair of channels, it should be understood that greater or fewer channels could be employed in clasp device.

In the embodiment depicted in FIGS. 1-9, winged push lock 106 has two wings 108 that extend outward from the center of winged push lock 106 and are located opposing each other. In other embodiments, winged push locks may have several wings extending from the center to engage more surface area of the swinging doors. Further, although not depicted, a rope clasp system can include multiple winged push locks that may be used to provide additional support in preventing a pair of swinging doors from releasing and swinging open and away from the base of the rope clasp system.

A locking mechanism such as winged push lock 106 can including a biasing member such as a spring to bias the lock in the open and/or closed position. In one embodiment, a spring biases the push lock 106 upwards. In such an embodiment, when the lock is in the closed position shown in FIG. 3, the upward biasing force maintains the pin 105 in the depression 109 in aperture 103. A downward force overcoming this biasing force is necessary to move the pin up to allow the push lock to be rotated and the pin 105 to travel through aperture 103 into the open position. When the push lock 106 is in the open position with its wings 108 perpendicular to the closed position, i.e., parallel with the long axis of the doors, the pin 105 rests in the angled slot 111 of aperture 103. Due to the angled slope of the slot 111, a downward force overcoming the biasing force must also be applied to allow the pin 105 to travel up the slot and back into the depression 109 as the pin is rotated back to the closed position.

Figure 5:
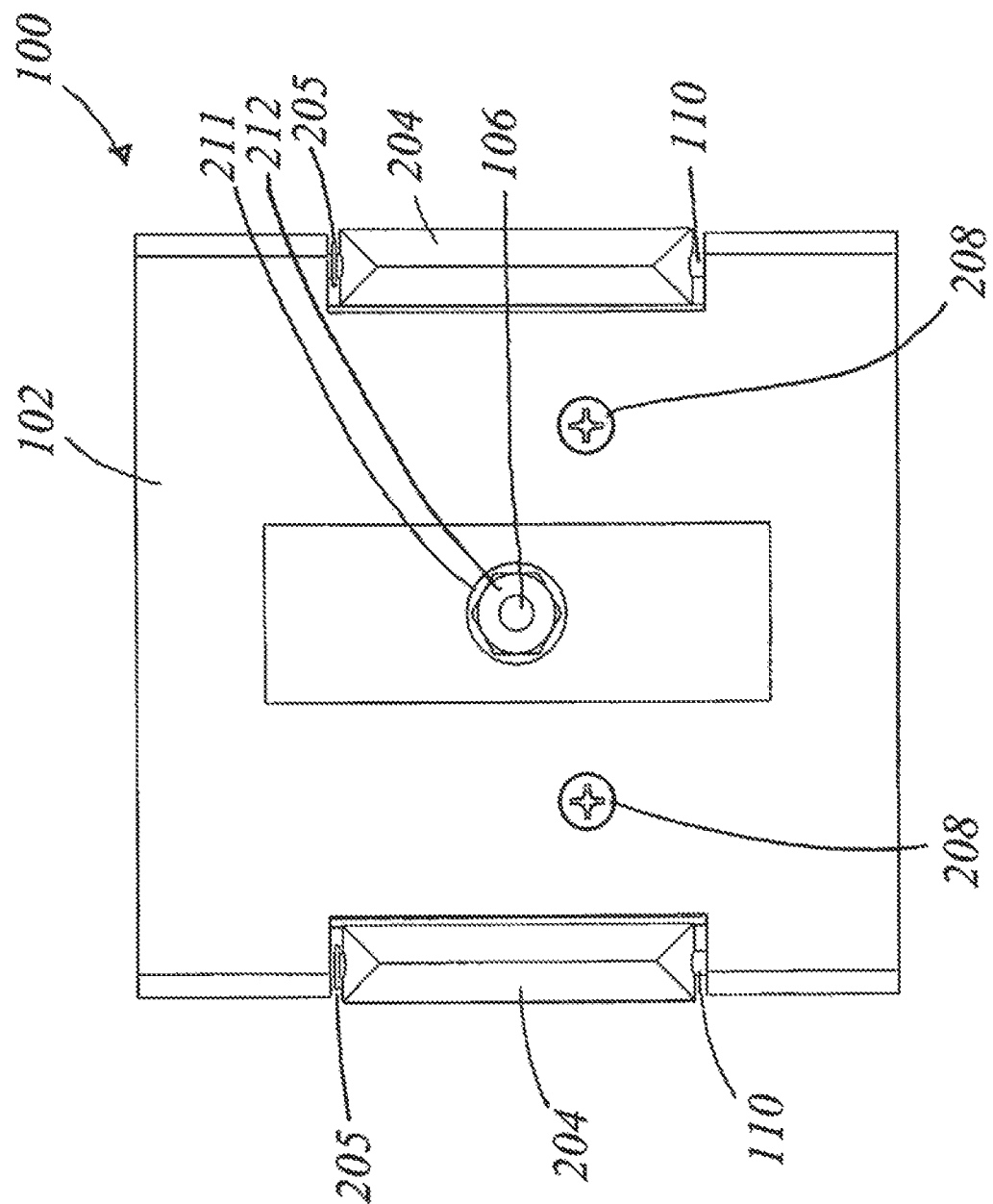
FIG. 5 depicts a bottom view of a rope clasp device in accordance with an embodiment of the present invention.

FIG. 5 illustrates the bottom of a rope clasp system according to an embodiment of the present invention. The bottom of rope clasp system 200 includes base 202, the bottom of swinging doors 204, hinge pin 206, recess screws 208, and the bottom of winged push lock 210. Winged push lock 210 is held in place by nut 212. A washer 211 can also be used. Nut 212 and optional washer 211 are recessed into base 202.

Recess screws 208 are utilized to hold down the teeth channel insert insert that are attached to the other side of the base so that they are kept in place and do not slide when tension is applied to a rope placed in rope clasp system 200. Hinge pins 206 pass through swinging doors 204 that are hinged to base 202 so that the swinging doors 204 can rotate at an angle away from the base 202 thereby allowing a rope to be placed or removed from the teeth channel insert. Washer 205 can be placed on hinge pin 206 between swinging door 204 and base 202.

Figure 6:
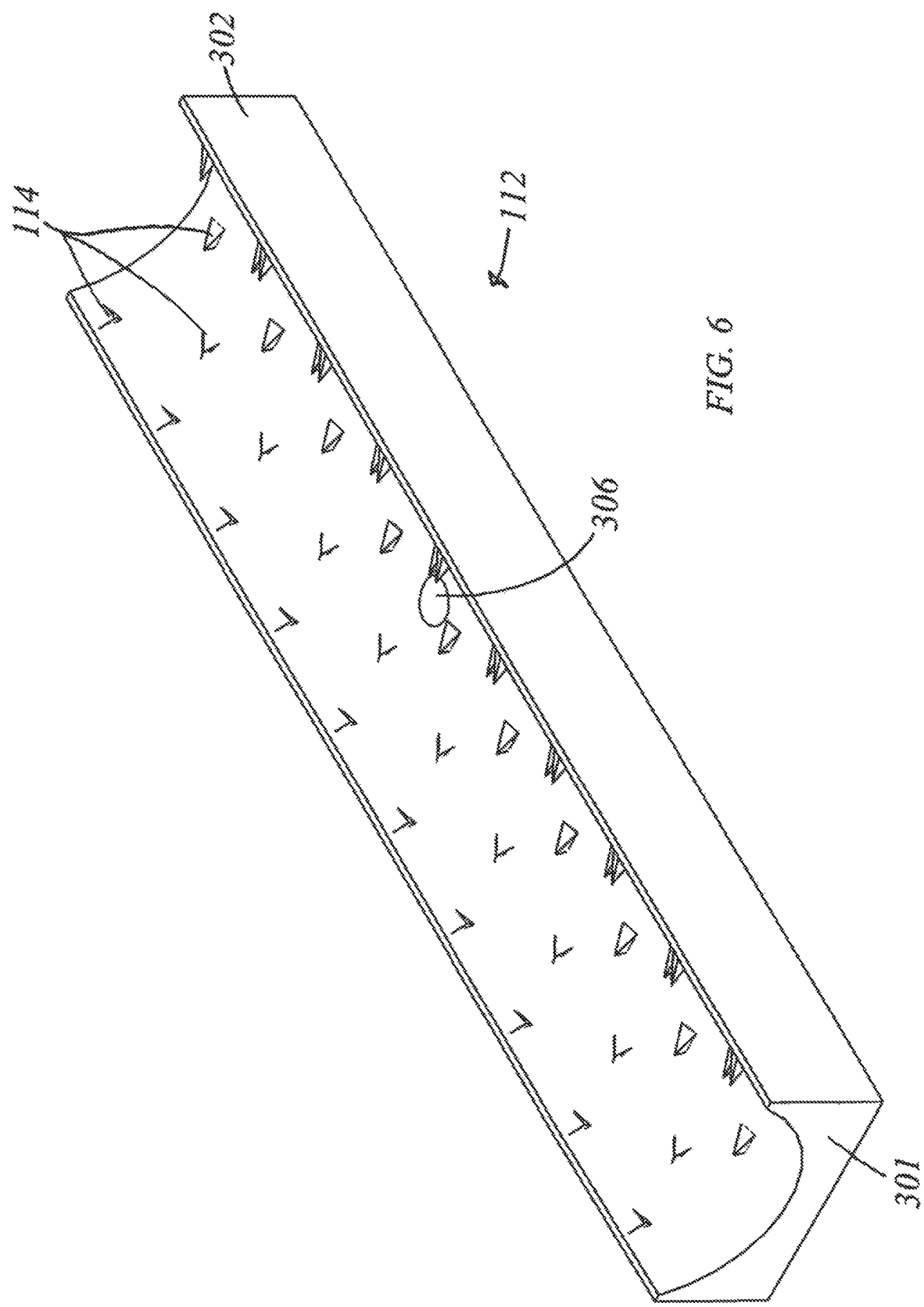
FIG. 6 depicts a perspective view of an interior of a rope channel of the rope clasp device in accordance with an embodiment of the present invention.

FIG. 6 depicts an embodiment of a teeth channel insert insert according to the present invention. Teeth channel insert 300 includes base 302, clasping teeth 304, and aperture 306. Teeth channel insert 300 may be attached to the bottom of a swinging door or the top of the base 102 of a rope clasp system 100 by screwing a recess screw or other fastener from the top of a swinging door 104 or the bottom of a base 102 through aperture 306. In FIG. 6, aperture 306 is located approximately midway from front end 301. In other embodiments, the aperture can be located at any other distance so long as the teeth channel insert 112 can be properly attached and recessed in a swinging door or base and so long as the teeth channel insert does not move when tension is applied to a rope placed within the rope clasp system. Also, although not featured in FIG. 6, multiple fastener apertures may be utilized and located throughout a teeth channel insert so that one can be sure the teeth channel insert will not slip when a significant amount of tension is applied to a rope. Further, in alternative embodiments in which teeth channel insert insert are recessed to the swinging doors and base without a screw but by other means an aperture may not be needed.

The clasping teeth 304 can encase a rope placed within a rope clasp system and allow for the expansion and lock of the rope. In FIG. 6, clasping teeth 304 are set at an angle and spread out evenly to spread the rope thread and expand a rope that is positioned in the teeth channel insert 300. Teeth channel insert 300 of FIG. 6 is set for a ½" rope; however, other sized and configured teeth channel insert insert can be used for other rope sizes.

In one embodiment, teeth channel insert 300 is molded solid and clasping teeth 304 are drilled in. Alternatively, the clasping teeth may be designed to be molded as part of the teeth channel insert. In another embodiment, teeth channel insert 300 can be formed and then holes drilled at an angle and then nails, spikes or pins slid into the holes to serve as clasping teeth 304 according to the present invention. The nails, spikes, or pins that serve as clasping teeth 304 are secured into solid, molded teeth channel insert 300 so that they can then bite into a rope that is placed within the rope clasp system as the rope clasp system closes. Clasping teeth 304 can be angled in a way so that they can bite into a rope and prevent the rope from slipping through the rope clasp system when tension is applied to the rope.

Figure 7:
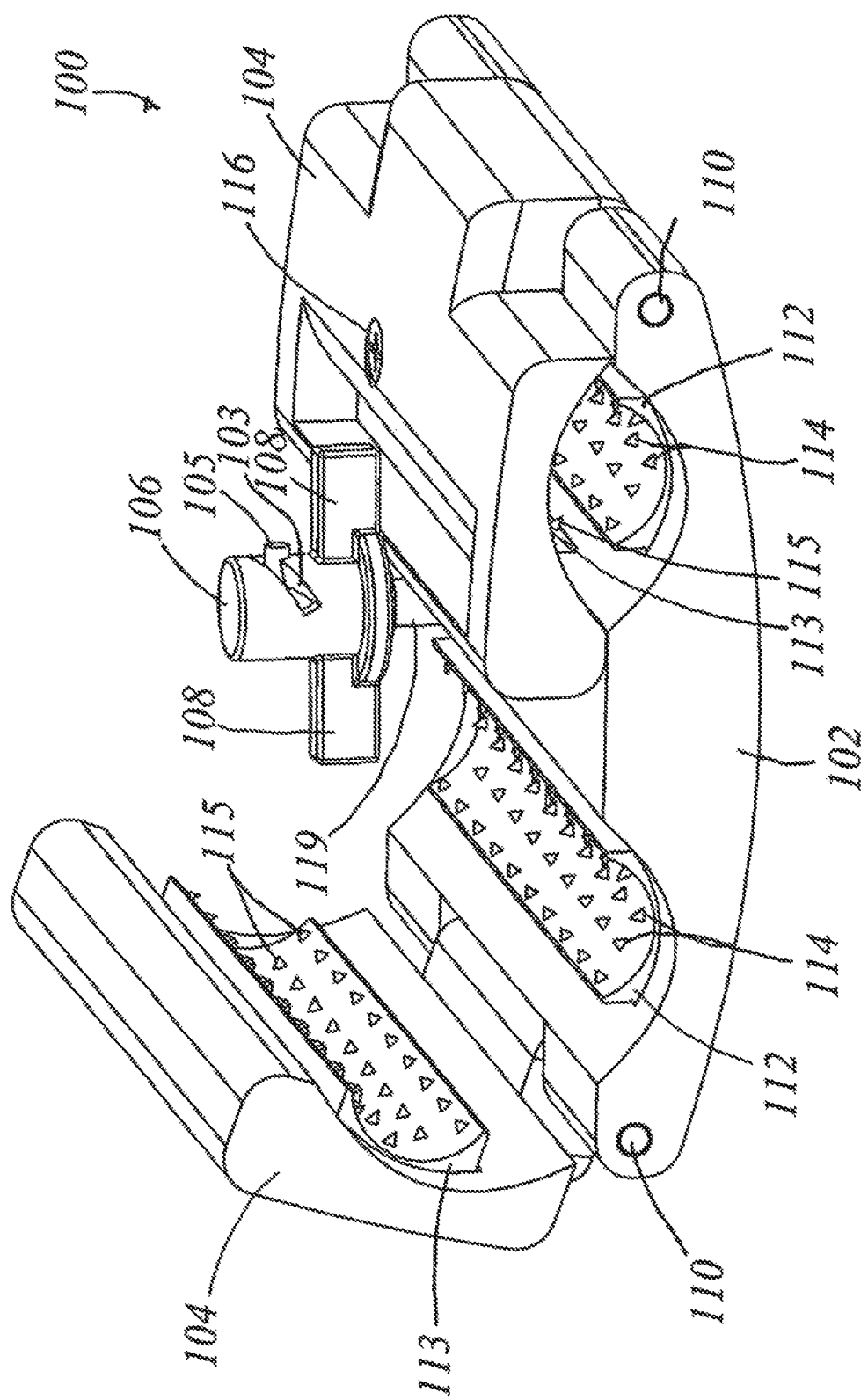
FIG. 7 depicts a perspective view of a rope clasp device with one swinging door open and one swinging door closed in accordance with an embodiment of the present invention.
Figure 8:
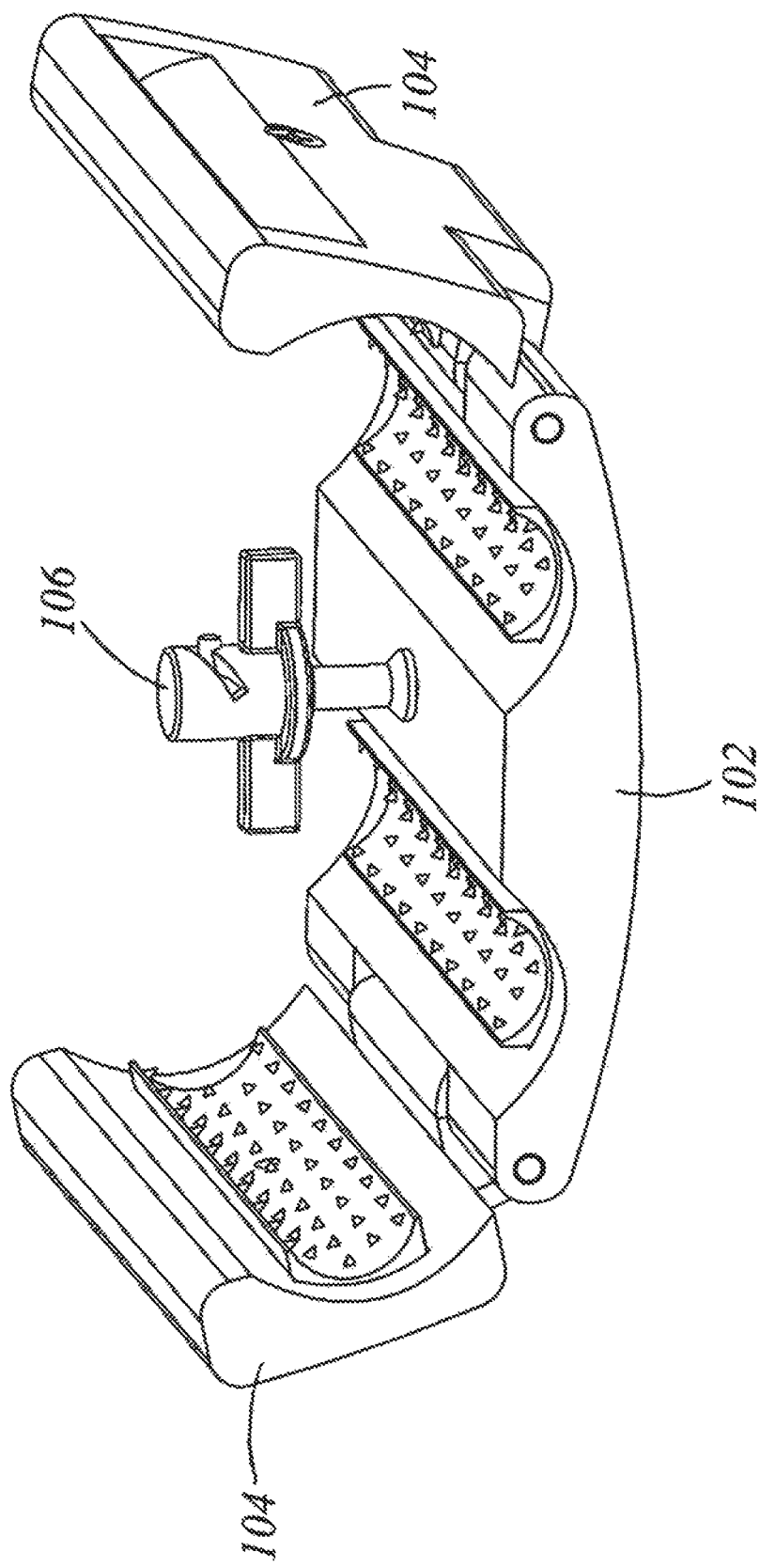
FIG. 8 depicts a perspective view of a rope clasp device with both swinging doors open in accordance with an embodiment of the present invention.

FIG. 7 depicts an embodiment of the rope clasp system 100 where one of the swinging doors is open and the other swinging door is kept in a locked position. As shown in FIG. 7, the rope clasp system 100 can be partially locked, with one swing door 104 in an open and relaxed position and the other swinging door 104 is in a closed and locked position. To partially unlock a rope that was previously in a locked position, a user may push down on and twist winged push lock 106 so that winged push lock pin 105 may slip into aperture 103 in a manner so that wings 108 are positioned parallel with hinge pins 110. It may be preferable to hold down swinging door 104 that the user wants to remain closed. Then, once the other swinging door 104 is released from under one of the wings 108, the user can then push down and twist winged push lock 106 in the opposite direction that the user originally turned from so that one of the wings 108 is perpendicular to hinge pins 110 and prevents swinging door 104 from popping up and into a relaxed position.

Figure 9:
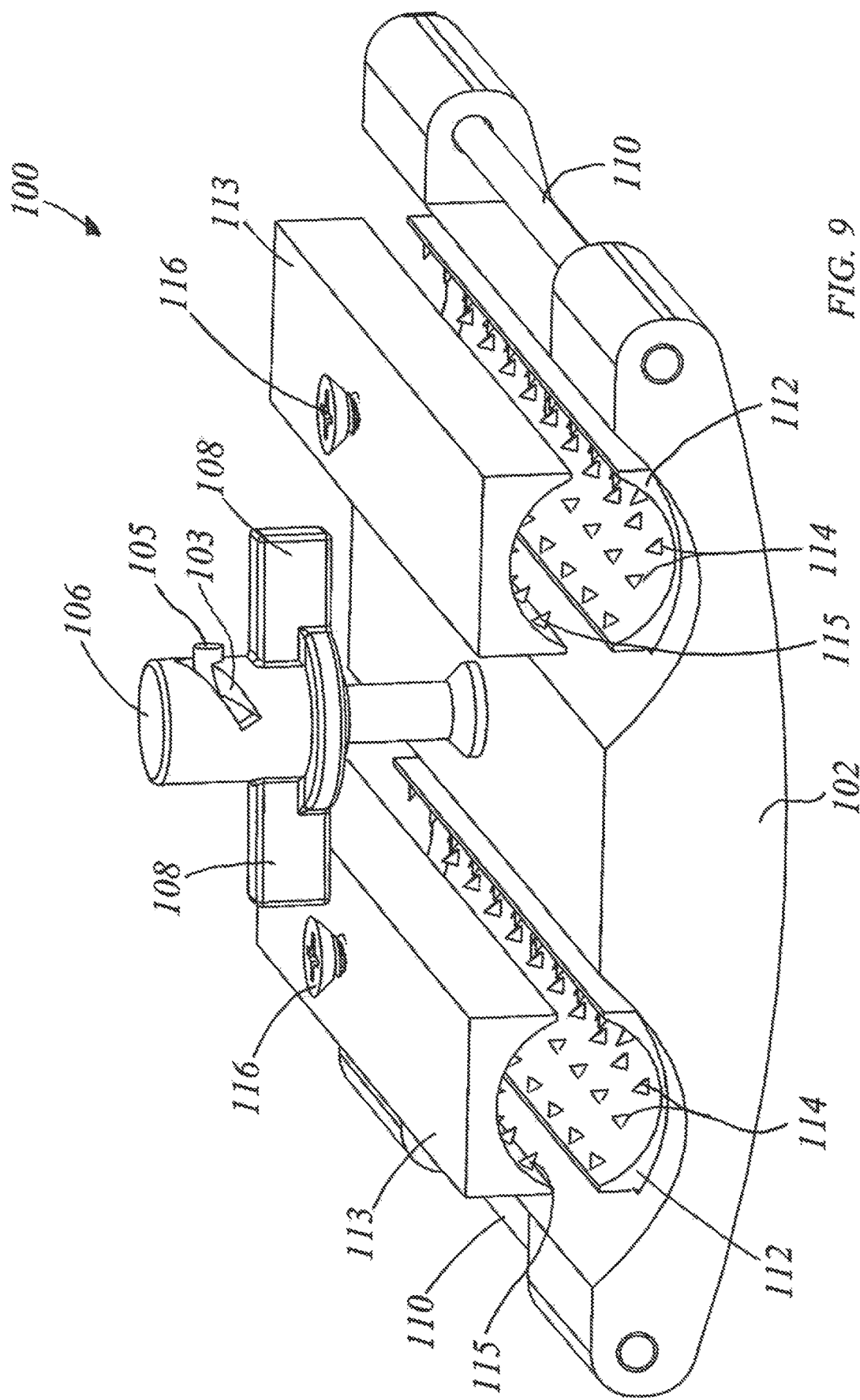
FIG. 9 depicts a perspective view of an interior portion of a rope clasp in accordance with an embodiment of the present invention.
Figure 10:
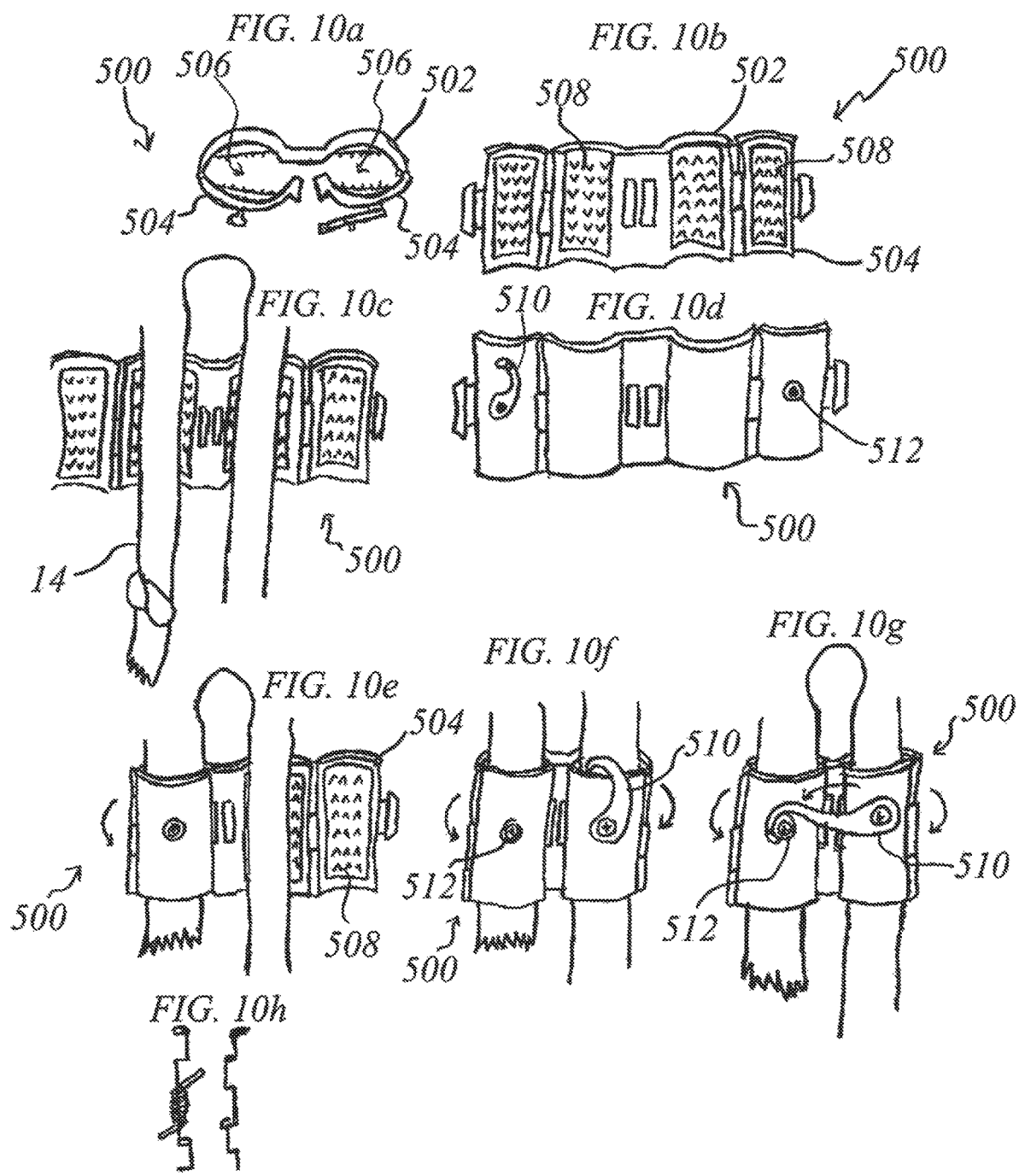
FIGS. 10a-h depict views of a rope clasp device with latch assembly in accordance with an embodiment of the present invention.

FIG. 9 illustrates the interior of an embodiment of the rope clasp system 100 where the swinging doors are not shown. FIG. 9 shows how teeth channel insert insert 112 and teeth channel insert insert 113 are separate pieces and how they attach. Teeth channel insert insert 112 and teeth channel insert insert 113 are recessed into swinging hinged doors and base 102 so they do not slip out when tension is on a rope that is positioned in rope clasp system 100. FIG. 9 also illustrates how hinge pins 110 run through base 102 of rope clasp system 100.

In one embodiment the screws holding the inserts into the doors and/or base can be slightly narrower than the channel through the corresponding door or base in which the screw sits, allowing for the screw to move slightly up and down within the channel. As the rope pulls tight into the teeth, this gap allows the screw to move inward in the channel to compress the insert onto the rope. This compression of the inserts compresses the rope to provide increased rope security.

FIG. 10*a*-10*h* depict rope clasp systems according to alternate embodiments of the invention. Rope clasp system 500 can include a base 502 and a pair of doors 504 hingedly attached to the base 502 and pivotable with respect to the base 502. The base 502 and doors 504 can define channels 506 therebetween. Teeth inserts 508 can be positioned within channels 506. As with previous embodiments, a rope 14 can be secured within the rope clasp 14 be closing the doors 504 over the rope 14 to position the rope within the channels 506. The device can be locked in the closed position be engaging a pivoting hook 510 on one of the doors 504 with an engagement pin 512 on the other door 504.

Figure 11:
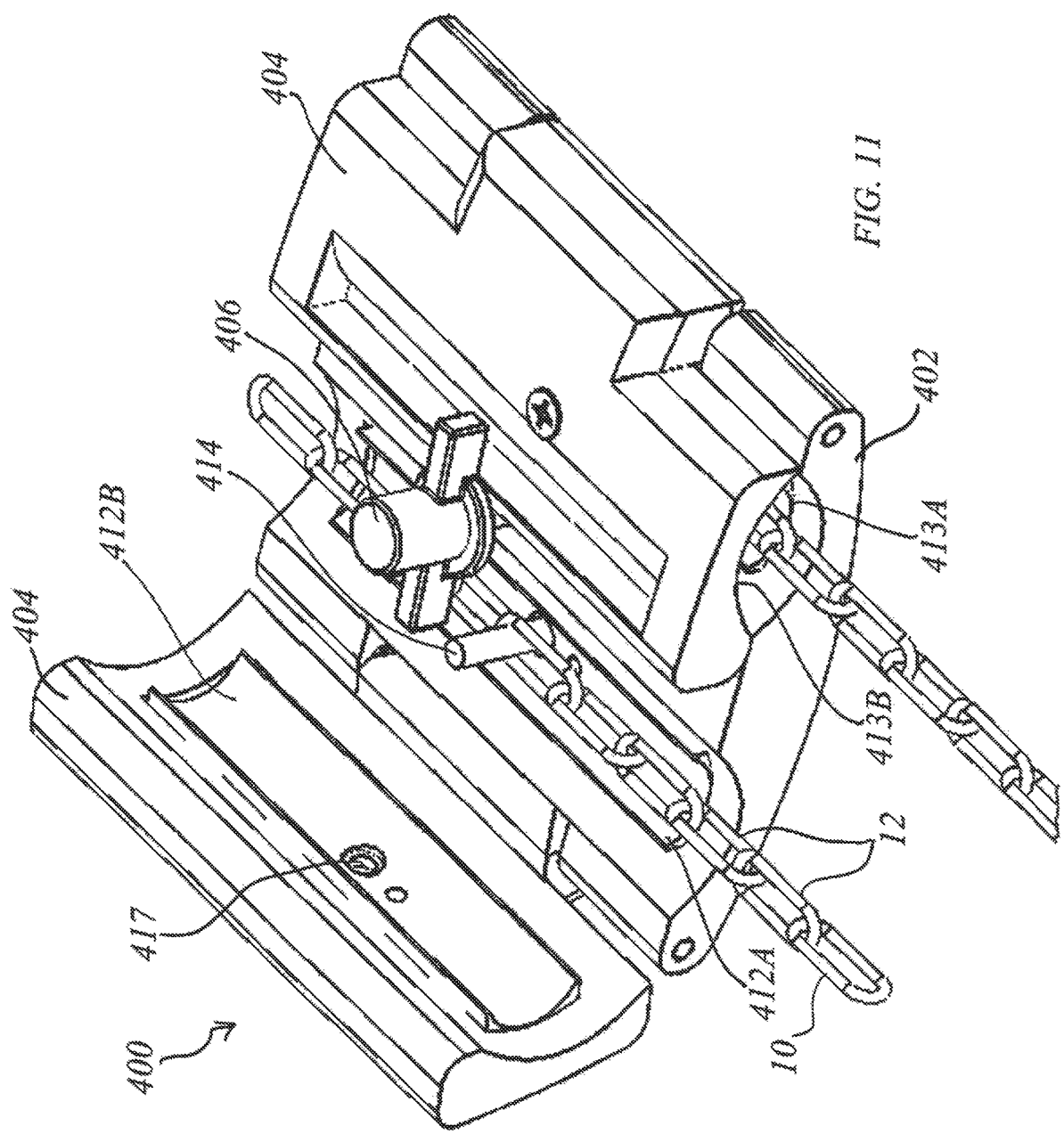
FIG. 11 depicts a rope clasp system according to an embodiment of the present invention.
Figure 12:
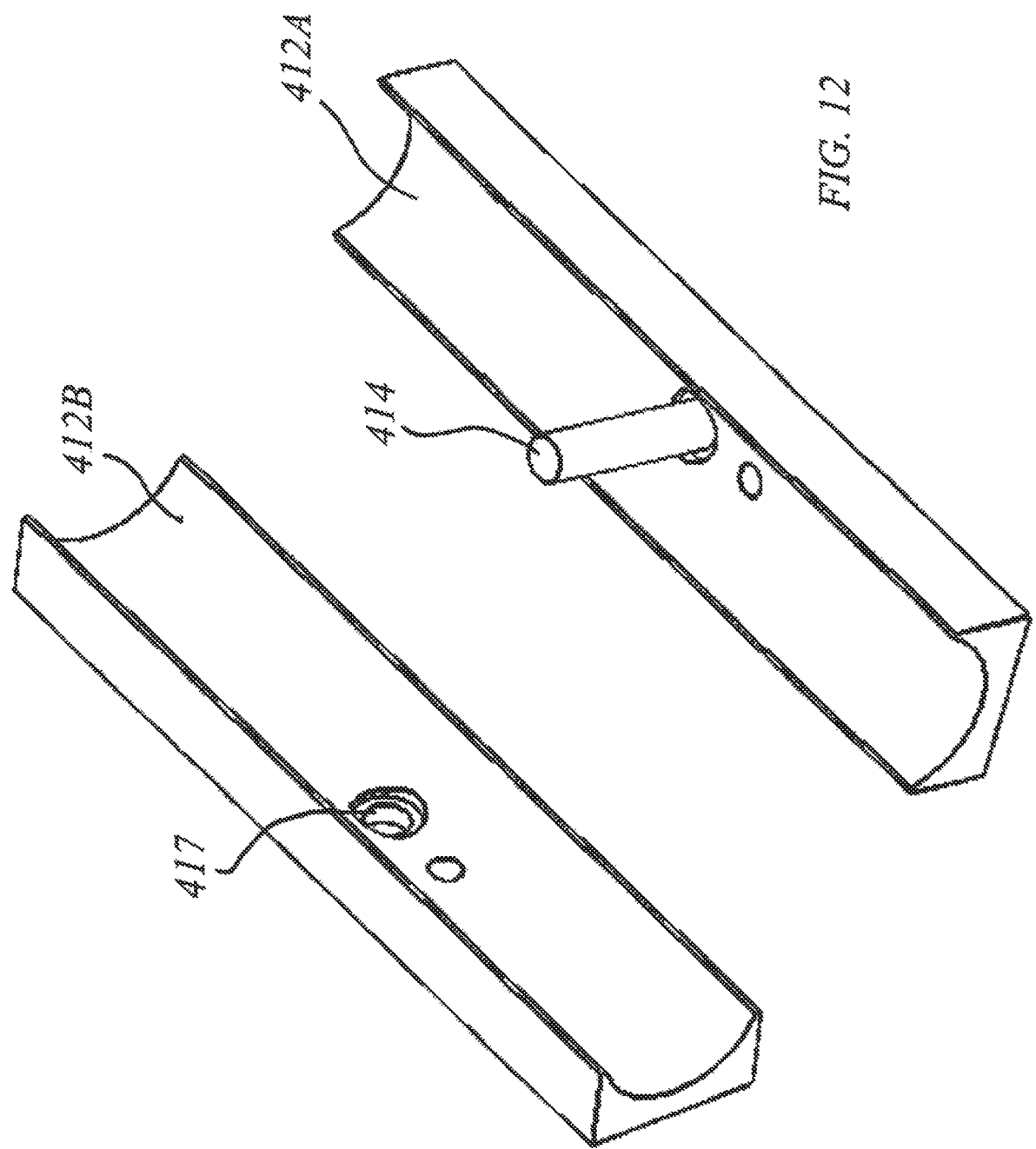
FIG. 12 depicts a portion of the rope clasp system of FIG. 11.
Figure 13:
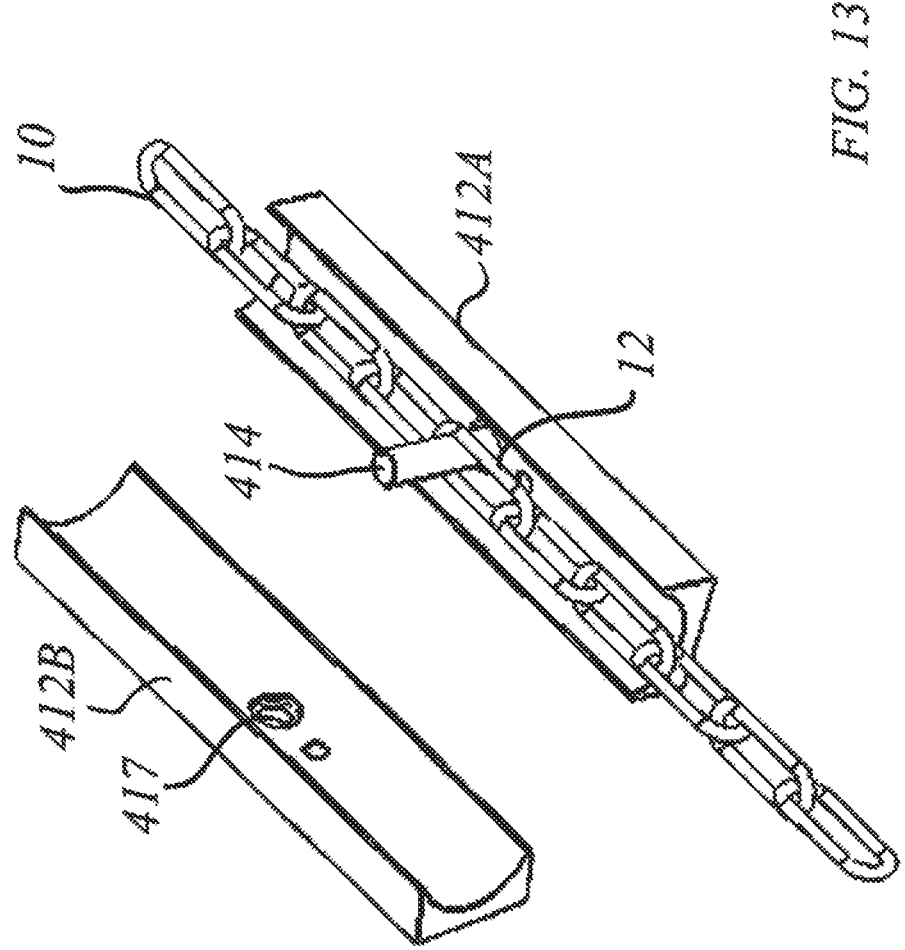
FIG. 13 depicts a portion of the rope clasp system of FIG. 11.

FIGS. 11-13 depict a rope clasp system 400 according to another embodiment of the present invention that is specifically designed for use with a chain 10 comprised of a plurality of chain links 12. Rope clasp system 400 includes a base 402, a pair of swinging doors 404, a lock pin 406 and channel inserts 412 and 413 similar to rope clasp system 100. However, instead of teeth, the channel inserts 412, 413 can each include an upwardly extending peg 414. Channel inserts 412, 413 can be inserted into and secured to base 402 and swing doors 404 in a similar manner to tooth channel inserts 112, 113. To secure a chain 10 with rope clasp 400, the swing doors 404 can be opened as described herein and the peg 414 can be inserted through the opening of a chain link 12 in at least one insert. The doors 404 can then be disclosed and locked as described herein. In one embodiment, the set of inserts 412A, 413A on one of the base 402 or doors 404 can include the peg 414 and a set of opposing inserts 412B, 413B can include a recess 417 into which the peg 414. Such an embodiment ensures that the chain is locked to the peg 414 and cannot accidentally be removed without opening doors 404. In one embodiment, the peg 414 has a diameter of one-eighth of an inch and the recess 417 has a diameter of three-sixteenths of an inch.

In one embodiment, the invention can be provided as a kit including a base with swing doors and a lock and a plurality of different types of inserts, such as teeth channel inserts and chain link post inserts. Differently sized inserts of the same type can also be provided in order to allow for accommodating of different sized ropes, chains, etc. In such a kit, the different channel inserts can be selectively inserted into a common base and set of swing doors depending on the particular application for which the clasp is going to be used.

This invention therefore addresses and resolves many of the deficiencies and drawbacks previously identified. The invention may be embodied in other specific forms without departing from the essential attributes thereof; therefore, the illustrated embodiments should be considered in all respects as illustrative and not restrictive.

Various embodiments of systems, devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be formed or combined. Accordingly, the embodiments are not mutually exclusive combinations of features; rather, the invention may comprise a combination of different individual features selected from different individual embodiments, as understood by persons of ordinary skill in the art.

The invention claimed is:

1. A rope clasp device comprising:
   a base having an inner surface and an outer surface;
   a one or more doors having an inner surface and an outer surface and pivotably attached to the base, the one or more doors being pivotable with respect to the base between an open position and a closed position wherein the inner surface of the one or more doors is confrontingly aligned with the inner surface of the base;
   first and second channels, each formed between the inner surface of the base and the inner surface of the one or more doors when the one or more doors is in the closed position, the channels including a plurality of teeth adapted to engage a rope;
   a locking mechanism adapted to selectively lock the one or more doors and the base in the closed position; and
   one or more teeth channel inserts selectively attachable to at least one of the base and the one or more doors, wherein the teeth are formed on the one or more teeth channel inserts,
   wherein the locking mechanism is rotatable about a single pivot point to selectively lock all of the one or more doors,
   wherein one or more of the one or more teeth channel inserts are selectively attachable to both the base and the one or more of doors,
   wherein the one or more doors is a pair of doors each including a teeth channel insert of the one or more teeth channel inserts selectively attachable to the respective door, and the base includes a pair of selectively attachable teeth channel inserts of the one or more teeth channel inserts such that each channel is defined between a teeth channel insert on the base and a teeth channel insert on one of the doors.

2. The rope clasp device of claim 1, wherein the inner surface of the at least one of the base and the one or more doors includes a recess extending into the inner surface corresponding to each of the one or more teeth channel inserts such that the one or more teeth channel inserts are recessed into the at least one of the base and the one or more doors.

3. The rope clasp device of claim 1, wherein the one or more teeth channel inserts are selectively attachable to the at least one of the base and the one or more doors with a removable fastener.

4. The rope clasp device of claim 3, wherein the removable fastener is configured to extend through an opening through the at least one of the base and the one or more doors into the one or more teeth channel inserts.

5. The rope clasp device of claim 4, where a diameter of a portion of the removable fastener configured to extend through the channel is smaller than a diameter of the channel.

* * * * *